United States Patent
Policke et al.

(10) Patent No.: US 9,475,706 B2
(45) Date of Patent: Oct. 25, 2016

(54) FUEL PREPARATION FOR USE IN THE PRODUCTION OF MEDICAL ISOTOPES

(71) Applicant: Babcock & Wilcox Technical Services Group, Inc., Lynchburg, VA (US)

(72) Inventors: Timothy A Policke, Forest, VA (US); Scott B Aase, Aiken, SC (US); William R Stagg, Southern Pines, NC (US)

(73) Assignee: BWXT Technical Services Group, Inc., Lynchburg, VA (US)

( * ) Notice: Subject to any disclaimer, the term of this patent is extended or adjusted under 35 U.S.C. 154(b) by 682 days.

(21) Appl. No.: 13/659,419

(22) Filed: Oct. 24, 2012

(65) Prior Publication Data

US 2014/0112858 A1    Apr. 24, 2014

(51) Int. Cl.
*C01G 43/00*    (2006.01)

(52) U.S. Cl.
CPC ..................................... *C01G 43/00* (2013.01)

(58) Field of Classification Search
CPC .... C01G 43/00; C01G 43/01; C01G 43/025; C01G 1/08; G21G 1/02; G21C 3/42–3/60
See application file for complete search history.

(56) References Cited

U.S. PATENT DOCUMENTS 5,112,581 A * 5/1992 Ohuchi et al. ................... 423/3
5,698,173 A * 12/1997 McLean et al. .............. 423/253

FOREIGN PATENT DOCUMENTS

EP    1041578 A2  * 10/2000
GB    696022     *  8/1953

OTHER PUBLICATIONS

Policke, Timothy, "Mo-99 Topical Meeting," Dec. 4-7, 2011, slides 1-24.*
Conner et al, "Production of Mo-99 From LEU Targets Acid-Side Processing" 2000 available at http://www.iaea.org/inis/collection/NCLCollectionStore/_Public/32/025/32025774.pdf.*
World Nuclear Association, "Processing of Used Nuclear Fuel," Apr. 2015, available at http://www.world-nuclear.org/info/Nuclear-Fuel-Cycle/Fuel-Recycling/Processing-of-Used-Nuclear-Fuel/.*

* cited by examiner

*Primary Examiner* — Wayne Langel
(74) *Attorney, Agent, or Firm* — Nelson Mullins Riley & Scarborough, LLP

(57) ABSTRACT

The present invention relates generally to the field of medical isotope production by fission of uranium-235 and the fuel utilized therein (e.g., the production of suitable Low Enriched Uranium (LEU is uranium having 20 weight percent or less uranium-235) fuel for medical isotope production) and, in particular to a method for producing LEU fuel and a LEU fuel product that is suitable for use in the production of medical isotopes. In one embodiment, the LEU fuel of the present invention is designed to be utilized in an Aqueous Homogeneous Reactor (AHR) for the production of various medical isotopes including, but not limited to, molybdenum-99, cesium-137, iodine-131, strontium-89, xenon-133 and yttrium-90.

43 Claims, No Drawings

FUEL PREPARATION FOR USE IN THE PRODUCTION OF MEDICAL ISOTOPES

STATEMENT REGARDING FEDERAL RIGHTS

This invention was made with government support under U.S. Department of Energy Contract No. DE-FC52-09NA29596 awarded by the U.S. Department of Energy. The government has certain rights in the invention.

FIELD AND BACKGROUND OF THE INVENTION

1. Field of the Invention

The present invention relates generally to the field of medical isotope production by fission of uranium-235 and the fuel utilized therein (e.g., the production of suitable Low Enriched Uranium (LEU is uranium having 20 weight percent or less uranium-235) fuel for medical isotope production) and, in particular to a method for producing LEU fuel and a LEU fuel product that is suitable for use in the production of medical isotopes. In one embodiment, the LEU fuel of the present invention is designed to be utilized in an Aqueous Homogeneous Reactor (AHR) for the production of various medical isotopes including, but not limited to, molybdenum-99, cesium-137, iodine-131, strontium-89, xenon-133 and yttrium-90.

2. Description of the Related Art

At the present time more than 50% of the world's annual production of radionuclides is used for medical purposes, such as for the early diagnoses of diseases and for therapy. A basic condition of the use of radionuclides in medicine is the requirement that the radiation exposure to a patient be minimal. This necessitates the use of short-lived radionuclides. A nuclide with a short half-life, however, creates difficulties in transportation and storage. One of the radionuclides used most often for medical purposes is molybdenum-99 with a half-life of 66 hours. Molybdenum-99 decay results in technetium-99m with a half-life of 6 hours and gamma energy at 140 keV, which is convenient for detection. Currently, more than 70% of diagnostic examinations are performed using this radionuclide.

One method of molybdenum-99 production involves using a target of natural molybdenum or molybdenum enriched in molybdenum-98 irradiated by a neutron flux in a nuclear reactor. Molybdenum-99 results from a neutron radiation capture by $^{98}Mo(n,\gamma)^{99}Mo$. The irradiated target containing molybdenum-99 then undergoes chemical purification. This method, however, has a low yield and the molybdenum-99 produced is characterized by a low specific activity due to the presence of unreacted molybdenum-98 in the final product.

Another method of molybdenum-99 production is based on uranium fission under neutron irradiation of a U—Al alloy or electroplated target in a nuclear reactor. The target contains high enriched uranium (HEU) which typically contains greater than about 85 weight percent uranium-235, which is also considered weapons grade uranium. After irradiation, the target is processed by one of the traditional chemical methods to extract molybdenum-99 from the fission products. The specific activity of molybdenum-99 achieved by this method is several tens of kilocuries per gram of molybdenum. A serious disadvantage of this method is the production and disposition of large amounts of radioactive wastes that are byproducts of the fission process, including some un-fissioned uranium. These targets are single-use. The activity of these wastes exceeds that of the molybdenum-99 material produced by two orders of magnitude. A twenty-four hour delay in processing the irradiated uranium targets results in a decrease of total activity by about an order of magnitude, during which time the molybdenum-99 activity decreases by approximately 22%. After two days, the activity of the waste byproducts exceeds that of the molybdenum-99 by a factor of six to seven. The problem of long-lived fission product management and security of the residual HEU are the major disadvantages in the production of molybdenum-99 by this method.

U.S. Pat. No. 5,596,611 discloses a small, dedicated uranyl nitrate ($UO_2(NO_3)_2$) Aqueous Homogeneous Reactor (AHR) for the production of molybdenum-99 in which the radioactive waste products are recirculated back into the reactor. A portion of the uranyl nitrate solution from the reactor is directly siphoned off and passed through columns of alumina to fix some of the fission products, including molybdenum-99, to the alumina. The molybdenum-99 and some fission products on the alumina column are then removed by elution with a hydroxide and the molybdenum-99 is either precipitated from the resultant solution with alpha-benzoin oxime or purified using other processes. This uranyl nitrate reactor has the advantage of recycling the fission byproducts.

Additionally, the dissolution of uranium or uranium materials to form uranyl nitrate is a common practice in the nuclear industry, as is the use of uranyl nitrate ($UO_2(NO_3)_2$) in solution reactors. However, the preparation of uranyl nitrate from LEU, including the dissolution of uranium materials in a nitric acid ($HNO_3$) matrix, in the form of a reactor fuel charge for a low power (less than 300 kW) AHR, with specific uranium concentration and pH requirements is a challenge which has yet to be met.

Accordingly, given the above, a need exists in the art for a LEU fuel that is designed to be utilized in an AHR for the production of various medical isotopes and for a corresponding method that produces a LEU fuel suitable for the production of medical isotopes.

SUMMARY OF THE INVENTION

The present invention relates generally to the field of medical isotope production by fission of uranium-235 and the fuel utilized therein (e.g., the production of suitable Low Enriched Uranium (LEU is uranium having 20 weight percent or less uranium-235) fuel for medical isotope production) and, in particular to a method for producing LEU fuel and a LEU fuel product that is suitable for use in the production of medical isotopes. In one embodiment, the LEU fuel of the present invention is designed to be utilized in an Aqueous Homogeneous Reactor (AHR) for the production of various medical isotopes including, but not limited to, molybdenum-99, cesium-137, iodine-131, strontium-89, xenon-133 and yttrium-90.

Accordingly, one aspect of the present invention is drawn to a method for producing a low enriched uranium fuel as reactor material, the method comprising the steps of: (a) providing at least one crystalline form of a uranyl nitrate hydrate; (b) subjecting the at least one crystalline form of the uranyl nitrate hydrate to an aqueous dissolution step to produce a solution containing at least one uranyl nitrate compound; (c) filtering the resulting solution to remove any insoluble residues; and (d) collecting the purified solution of the at least one uranyl nitrate compound.

In yet another aspect of the present invention, there is provided a method for producing a low enriched uranium fuel as reactor material, the method comprising the steps of:

(i) providing at least one uranium oxide; (ii) adding at least one liquid acid compound to the at least one uranium oxide to produce a solution of one or more uranyl nitrate compounds; (iii) subjecting the one or more uranyl nitrate compounds to a heat-based aqueous dissolution step to produce a solution containing at least one uranyl nitrate compound; (iv) filtering the resulting solution to remove any insoluble residues; and (v) collecting the purified solution of the at least one uranyl nitrate compound.

In yet another aspect of the present invention, there is provided a method for producing a low enriched uranium fuel as reactor material, the method comprising the steps of: (A) providing at least one uranium metal or uranium source; (B) adding at least one liquid acid compound to the at least one uranium metal or uranium source to produce a solution of one or more uranyl nitrate compounds; (C) subjecting the one or more uranyl nitrate compounds to a heat-based aqueous dissolution step to produce a solution containing at least one uranyl nitrate compound; (D) filtering the resulting solution to remove any insoluble residues; and (E) collecting the purified solution of the at least one uranyl nitrate compound.

The various features of novelty which characterize the invention are pointed out with particularity in the claims annexed to and forming a part of this disclosure. For a better understanding of the invention, its operating advantages and specific benefits attained by its uses, reference is made to the accompanying descriptive matter in which exemplary embodiments of the invention are illustrated.

DESCRIPTION OF THE INVENTION

The present invention relates generally to the field of medical isotope production by fission of uranium-235 and the fuel utilized therein (e.g., the production of suitable Low Enriched Uranium (LEU is uranium having 20 weight percent or less uranium-235) fuel for medical isotope production) and, in particular to a method for producing LEU fuel and a LEU fuel product that is suitable for use in the production of medical isotopes. In one embodiment, the LEU fuel of the present invention is designed to be utilized in an Aqueous Homogeneous Reactor (AHR) for the production of various medical isotopes including, but not limited to, molybdenum-99, cesium-137, iodine-131, strontium-89, xenon-133 and yttrium-90.

While the present invention will be described in terms of producing a LEU fuel for an AHR, the present invention is not limited to solely AHRs. Rather, the present invention can be utilized to produce a LEU fuel for any type of liquid reactor, or accelerator that uses a uranyl nitrate solution, regardless of whether such reactor is designed to produce medical isotopes.

In one embodiment, the present invention is directed towards a process, or method, for producing a uranyl nitrate fuel charge to an AHR. In one such instance, the fuel base produced by the process, or method, of the present invention is suitable for use in an AHR and can be utilized to produce molybdenum-99 as well as other medically valuable isotopes. In another embodiment, the fuel in question is uranyl nitrate in a nitric acid matrix. In still another embodiment, the fuel in question is uranyl nitrate in a nitric acid matrix, wherein such fuel possesses a pH, an uranium content, and/or a uranium enrichment level within specific ranges.

In one embodiment, the pH of the fuel produced by the process, or method, of the present invention has a pH in the range of about 0.1 to about 2.5, or from about 0.3 to about 2.0, or from about 0.5 to about 1.7, or from about 0.7 to about 1.5, or from about 0.8 to about 1.2, or even about 1.0 pH units. Here, as well as elsewhere in the specification and claims, individual numerical values, or limits, from one or more embodiments, or different ranges, can be combined to form additional non-disclosed and/or non-stated ranges. It should be noted that the pH of the fuel in question is, in this embodiment, primarily a function of the $HNO_3$ concentration when the uranyl nitrate is in solution.

In one embodiment, the uranium concentration in the fuel produced by the process, or method, of the present invention is in the range of about 100 grams of uranium per liter to about 200 grams of uranium per liter, or from about 110 grams of uranium per liter to about 190 grams of uranium per liter, or from about 120 grams of uranium per liter to about 180 grams of uranium per liter, or from about 125 grams of uranium per liter to about 175 grams of uranium per liter, or from about 130 grams of uranium per liter to about 170 grams of uranium per liter, or from about 140 grams of uranium per liter to about 160 grams of uranium per liter, or even about 150 grams of uranium per liter. Here, as well as elsewhere in the specification and claims, individual numerical values, or limits, from one or more embodiments, or different ranges, can be combined to form additional non-disclosed and/or non-stated ranges.

In one embodiment, the enrichment level for the uranium is less than about 20 weight percent, less than about 19.5 weight percent, less than about 19 weight percent, less than about 18 weight percent, less than about 17 weight percent, or even less than about 15 weight percent. In another embodiment, the enrichment level for the uranium is in the range of about 19 weight percent to about 19.9 weight percent uranium-235. Here, as well as elsewhere in the specification and claims, individual numerical values, or limits, from one or more embodiments, or different ranges, can be combined to form additional non-disclosed and/or non-stated ranges. Thus, when the enrichment level for the uranium is less than about 20 weight percent uranium-235, such fuel is considered LEU.

In one embodiment, the present invention relates to a process to produce a LEU fuel, wherein such fuel possesses a pH, a uranium content and/or a uranium enrichment level as described above, from either uranyl nitrate hydrated crystals (UNH for uranyl nitrate hexahydrate or UNX for uranyl nitrate having hydrations other than hexahydrate). In another embodiment, the present invention relates to a process to produce a LEU fuel, wherein such fuel possesses a pH, a uranium content and/or a uranium enrichment level as described above, from uranium oxide (either $U_3O_8$, $UO_3$, $UO_2$), or from uranium metal or uranium source. The dissolution of uranyl nitrate hydrate crystals, oxides of uranium, uranium metal, or uranium source in $HNO_3$ results in a uranyl nitrate solution. The resultant solution is then evaporated to dryness, or near dryness, to remove any excess $HNO_3$ and water ($H_2O$). This yields a soluble uranium salt that is suitable for use in the preparation of a final fuel charge, wherein the soluble uranium salt possesses a pH, a uranium content and/or a uranium enrichment level as described above. Such a salt can be suitable for use in a reactor (e.g., an AHR) or can be suitably modified for use in a suitable reactor (e.g., an AHR).

In one embodiment, the process of the present invention is carried out in a circulated and heated stainless steel vessel or column, designated below as the dissolution container. The dissolution container is to be of a criticality unfavorable (safe) geometry (such as a circular container or other shape as is known to those of skill in the art), have an inner diameter of less than 14.4 cm, have a pump or stirrer designed to circulate the contents thereof, and have an inline filtration system designed to prevent solids from clogging process piping.

The above described dissolution process should be designed to prepare, in one embodiment, a stock solution concentration of about 200 grams of uranium per liter to about 300 grams of uranium per liter, or from about 210 grams of uranium per liter to about 290 grams of uranium per liter, or from about 220 grams of uranium per liter to about 280 grams of uranium per liter, or from about 225 grams of uranium per liter to about 275 grams of uranium per liter, or from about 230 grams of uranium per liter to about 270 grams of uranium per liter, or from about 240 grams of uranium per liter to about 260 grams of uranium per liter, or even about 250 grams of uranium per liter. Here, as well as elsewhere in the specification and claims, individual numerical values, or limits, from one or more embodiments, or different ranges, can be combined to form additional non-disclosed and/or non-stated ranges.

First, in the embodiment in which UNX or UNH crystals are utilized, the material is added to a suitable dissolution container. Water is added to a minimum ratio of about 2.0 mL of water to each gram of uranium to about 6.0 mL of water to each gram of uranium, or even about 4.0 mL of water to each gram of uranium. The dissolution container temperature can be in the range of about 20° C. to about 85° C., which permits gentle heating if necessary. Concentrated (nominal 70 percent) $HNO_3$ may then be added, although it is not necessarily needed, to facilitate the dissolution and to dissolve any acid soluble impurities and/or remnant uranium oxides that may be present. The solution is then filtered as necessary through a suitable filter to remove any insoluble materials. One such suitable filter is a 2.0 micron stainless steel filter, although the present invention is not limited thereto. The filtered uranium solution is then diluted with water to a final stock solution concentration range. The concentration is in the range of about 100 grams of uranium per liter to about 200 grams of uranium per liter, or from about 110 grams of uranium per liter to about 190 grams of uranium per liter, or from about 120 grams of uranium per liter to about 180 grams of uranium per liter, or from about 125 grams of uranium per liter to about 175 grams of uranium per liter, or from about 130 grams of uranium per liter to about 170 grams of uranium per liter, or from about 140 grams of uranium per liter to about 160 grams of uranium per liter, or even about 150 grams of uranium per liter. Here, as well as elsewhere in the specification and claims, individual numerical values, or limits, from one or more embodiments, or different ranges, can be combined to form additional non-disclosed and/or non-stated ranges.

The dissolution reaction is as shown below:

$$UO_2(NO_3)_2 \cdot x\ H_2O_{(s)} \rightarrow UO_2(NO_3)_{2(aq)} + x\ H_2O_{(l)},$$

where x is typically equal to 6 (for UNH), but can be in the range of 1 to 6 (as acid deficient uranyl nitrate, designated UNX) and may not necessarily be an integer (for UNX). Although the above reaction is shown for the dissolution reaction of uranyl nitrate in $H_2O$, the dissolution can be promoted through the use of 0.1 M nitric acid. Alternatively, the uranyl nitrate solution generated as per the above process can be heated to between about 400° C. and about 500° C. in a muffle furnace with a supply of oxygen ($O_2$), including an air sparge that contains oxygen, to convert the uranyl nitrate to $UO_3$, which can be dissolved as described below.

In another embodiment, if the starting material for the process of the present invention is an oxide of uranium, heat is generally utilized to ensure complete dissolution thereof.

In this embodiment, the desired uranium oxide material is added to a dissolution container in accordance with the details provided above. If the oxide material is not dry, it is dried in an oven or furnace at temperatures between about 95° C. and about 135° C., even about 120° C., for at least about 2 hours and then permitted to cool. Next, concentrated (nominal 70 percent) $HNO_3$ and water are added, targeting a ratio of 1 mL water to 1 mL of $HNO_3$ to 1 gram of uranium. Heat is then gently applied as needed to achieve dissolution. The solution is then filtered as necessary through a suitable filter to remove any insoluble materials. One such suitable filter is a 2.0 micron stainless steel filter, although the present invention is not limited thereto. The filtered uranium solution is then diluted with water to a final stock solution concentration range. The concentration range is in the range of about 100 grams of uranium per liter to about 200 grams of uranium per liter, or from about 110 grams of uranium per liter to about 190 grams of uranium per liter, or from about 120 grams of uranium per liter to about 180 grams of uranium per liter, or from about 125 grams of uranium per liter to about 175 grams of uranium per liter, or from about 130 grams of uranium per liter to about 170 grams of uranium per liter, or from about 140 grams of uranium per liter to about 160 grams of uranium per liter, or even about 150 grams of uranium per liter. Here, as well as elsewhere in the specification and claims, individual numerical values, or limits, from one or more embodiments, or different ranges, can be combined to form additional non-disclosed and/or non-stated ranges. The dissolution reactions for $U_3O_8$ can be represented as:

$$U_3O_{8(s)} + 8\ HNO_{3(aq)} \rightarrow 3\ UO_2(NO_3)_{2(aq)} + 4\ H_2O_{(l)} + 2\ NO_{2(g)},\ or$$

$$3\ U_3O_{8(s)} + 20\ HNO_{3(aq)} \rightarrow 9\ UO_2(NO_3)_{2(aq)} + 10\ H_2O_{(l)} + 2\ NO_{(g)}.$$

Since $U_3O_8$ is a mixed-valence oxide which is often non-stoichiometric (i.e., not exactly a 3:8 atom ratio), the exact quantity of $HNO_3$ required and the quantities of NO and $NO_2$ produced may not be the same for all batches of "$U_3O_8$". A mixture of nitrogen oxides is typically produced. Alternatively, the $U_3O_8$ can be oxidized at a sufficient temperature, such as about 100° C. to about 120° C., in an oxidizing environment (e.g., an air sparge is sufficient) to $UO_3$. Additionally, the dissolution reaction for $UO_3$ can be represented as:

$$UO_{3(s)} + 2\ HNO_{3(aq)} \rightarrow UO_2(NO_3)_{2(aq)} + H_2O_{(l)}.$$

The dissolution of $UO_2$ can be represented as:

$$UO_{2(s)} + 4\ HNO_{3(aq)} \rightarrow UO_2(NO_3)_{2(aq)} + 2\ H_2O_{(l)} + 2\ NO_{2(g)},\ or$$

$$3\ UO_{2(s)} + 8\ HNO_{3(aq)} \rightarrow 3\ UO_2(NO_3)_{2(aq)} + 4\ H_2O_{(l)} + 2\ NO_{(g)}.$$

In still another embodiment, uranium metal, or a suitable uranium source, can be dissolved by direct interaction with water and concentrated (nominal 70 percent) $HNO_3$ mixture, not to exceed a composition of 75 weight percent $HNO_3$ to 25 weight percent $H_2O$ (3:1 dilution). If one suspects any exterior impurity contamination on the uranium metal, then the metal is subjected to 1 M $HNO_3$ that is disposed of as waste, followed by a fresh application of the diluted acid (3:1) for complete dissolution. Next heat is gently applied as needed to achieve dissolution. The solution is then filtered as necessary through a suitable filter to remove any insoluble materials. One such suitable filter is a 2.0 micron stainless steel filter, although the present invention is not limited thereto. The filtered uranium solution is then diluted with water to a final stock solution concentration range. The concentration range is in the range of about 100 grams of uranium per liter to about 200 grams of uranium per liter, or from about 110 grams of uranium per liter to about 190 grams of uranium per liter, or from about 120 grams of uranium per liter to about 180 grams of uranium per liter, or from about 125 grams of uranium per liter to about 175 grams of uranium per liter, or from about 130 grams of uranium per liter to about 170 grams of uranium per liter, or from about 140 grams of uranium per liter to about 160 grams of uranium per liter, or even about 150 grams of uranium per liter. Here, as well as elsewhere in the specification and claims, individual numerical values, or limits, from one or more embodiments, or different ranges, can be combined to form additional non-disclosed and/or non-stated ranges. The dissolution reactions can be represented as:

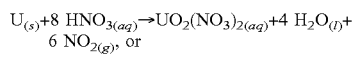

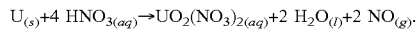

As with the oxides above, the exact quantity of nitric acid required and the mixture of nitrogen oxides produced can vary. Alternatively, uranium metal, or suitable uranium source, can be oxidized in either oxygen, or air, at a temperature in the range of about 400° C. and about 600° C. to either $U_3O_8$ or $UO_3$. The dissolution would then follow one of the oxide embodiments described above.

Once the uranium is in solution in the form of $UO_2(NO_3)_2$, the solution is evaporated to dryness or near dryness, at a temperature in the range of about 85° C. to about 115° C., even about 100° C., to remove any excess $HNO_3$ and $H_2O$ and to bring the uranium to a readily soluble salt form for final fuel charge preparation. Finally, the pH and uranium concentration are adjusted as follows to fall within one of the ranges detailed above.

The dried uranium salt is dissolved in 0.10 M $HNO_3$ and the pH is adjusted to achieve a pH in the range of about 0.1 to about 2.5, or from about 0.3 to about 2.0, or from about 0.5 to about 2.7, or from about 0.7 to about 1.5, or from about 0.8 to about 1.2, or even about 1.0 pH units. Here, as well as elsewhere in the specification and claims, individual numerical values, or limits, from one or more embodiments, or different ranges, can be combined to form additional non-disclosed and/or non-stated ranges. The uranium concentration is adjusted so that the uranium concentration falls in the range of about 100 grams of uranium per liter to about 200 grams of uranium per liter, or from about 110 grams of uranium per liter to about 190 grams of uranium per liter, or from about 120 grams of uranium per liter to about 180 grams of uranium per liter, or from about 125 grams of uranium per liter to about 175 grams of uranium per liter, or from about 130 grams of uranium per liter to about 170 grams of uranium per liter, or from about 140 grams of uranium per liter to about 160 grams of uranium per liter, or even about 150 grams of uranium per liter. Here, as well as elsewhere in the specification and claims, individual numerical values, or limits, from one or more embodiments, or different ranges, can be combined to form additional non-disclosed and/or non-stated ranges.

The pH adjustment is performed using an acid, for example $HNO_3$, to lower the pH into one of the acceptable ranges detailed above. In some instances, a base, such as lithium hydroxide (LiOH) and more specifically lithium-7 enriched lithium hydroxide ($^7$LiOH), usually in the monohydrate form, can be utilized to raise the pH into one of the acceptable ranges detailed above. Other bases can be utilized and can include ammonium hydroxide, $NH_4OH$, or metal hydroxides. Successive additions of $H_2O$, $HNO_3$, and/or $^7$LiOH (or other bases) are performed to bring the pH (as well as the uranium concentration) to within acceptable ranges as one of those detailed above. The final uranium solution is then filtered as necessary through a suitable filter to remove any insoluble materials. One such suitable filter is a 2.0 micron stainless steel filter, although the present invention is not limited thereto.

In one embodiment, the $HNO_3$ is at least American Chemical Society (ACS) Reagent Grade. A hot plate/stirrer is used to provide the gentle heating for the dissolutions. The $^7$LiOH, if utilized, is at least, or equivalent to, Grade X (one of a number of grades of materials, the grades being primarily B, X and A, sold by NUKEM, Inc. of Danbury, Conn.).

The process, or method, of the present invention makes possible the preparation and adjustment of LEU as uranyl nitrate, including the dissolution of various uranium materials in a nitric acid matrix, in the form of a reactor fuel charge for an AHR. This AHR reactor fuel so generated has specific uranium concentration, isotopic composition, and pH requirements and it may be used for the production of molybdenum-99, or other medical isotopes such as cesium-137, iodine-131, strontium-89, xenon-133 and yttrium-90.

The process of the present invention is novel for a number of reasons. First, the present invention details the preparation of LEU as uranyl nitrate for use as a fuel for an AHR, with specific operating parameters, for the production of molybdenum-99 for the Medical Isotope Production System (MIPS). Those parameters are pH, uranium concentration, and LEU isotopic composition.

Secondly, the present invention details various methods which can utilize various forms of uranium, namely UNH or UNX, $UO_2$, $UO_3$, $U_3O_8$, and U metal, or a suitable uranium source thereof, to prepare the uranyl nitrate, which, as a collective grouping, is unique. The preparation steps outlined permit the use of any of these specific forms of uranium to produce a purified stock solution. The desired purification is achieved through the additional effort to filter the initial dissolution to remove any insoluble impurities, take that solution to dryness to remove any existing volatile impurities and to remove any excess $HNO_3$, re-dissolve the dried material in 0.10 M $HNO_3$ to produce a solution that is at the operating pH of, for example, 1, followed by a final filtration to remove any un-dissolved material.

Thirdly, the pH adjustment methodology of the present invention is unique for a reactor fuel solution. This adjustment of increasing the pH mainly targets the use of LiOH, and to a lesser extent $NH_4OH$ and metal hydroxides. Although LiOH, and thus $^7$LiOH, has a historical use for adjusting the pH of reactor coolant, its use for adjusting the pH of an actual fuel solution is novel, especially as it relates to an AHR and a MIPS. Additionally, the choice of LiOH, as well as $NH_4OH$, prevents the introduction and buildup of undesirable chemical species in the reactor fuel solution that is to be recycled. Lithium has two isotopes: lithium-6 and lithium-7. In the reactor environment, the Li will form hydrogen-3, which should be scrubbed in a re-combiner, or helium-4, which should exit in the off-gas, or both. Also, if $NH_4OH$ is used, then the $NH_4^+$ will be converted to $NH_3$ and also exit in the off-gas. Thus, none of these species, lithium-6, lithium-7, hydrogen-3, helium-4, $NH_4^+$, or $NH_3$ will build up in the reactor over time, unlike the usual metal hydroxides that are used for pH adjustment. Finally, the use of this fuel preparation for the production of $^{99}$Mo is applicable to other medical isotopes, such as cesium-137, iodine-131, strontium-89, xenon-133 and yttrium-90.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for producing a low enriched uranium fuel as reactor material, the method comprising the steps of:
   (a) providing at least one crystalline form of a uranyl nitrate hydrate;
   (b) subjecting the at least one crystalline form of the uranyl nitrate hydrate to an aqueous dissolution step to produce a solution containing at least one uranyl nitrate compound;
   (c) filtering the solution from Step (b) to remove any insoluble residues; and
   (d) collecting the solution from Step (c) that contains at least one uranyl nitrate compound,
   wherein the amount of uranium-235 in the uranyl nitrate solution of Step (d) is from about 15 weight percent to about 20 weight percent.

2. The method of claim 1, wherein the one or more uranyl nitrate hydrate compounds are selected from uranyl nitrate hydrate having a hexahydrate (UNH), uranyl nitrate hydrate having hydrations other than hexahydrate (UNX), or a combination of two or more thereof.

3. The method of claim 1, wherein aqueous dissolution Step (b) is conducted in a dissolution vessel having a circulation system to both circulate the aqueous solution contained therein and to prevent any solid impurities from blocking the circulation system.

4. The method of claim 3, wherein the one or more uranyl nitrate hydrate compounds are selected from uranyl nitrate hydrate having a hexahydrate (UNH), uranyl nitrate hydrate having hydrations other than hexahydrate (UNX), or a combination of two or more thereof.

5. The method of claim 1, wherein the method further comprises the step of:
   (e) adding at least one liquid acid compound or at least one liquid base compound to the solution of Step (d) to yield a solution having a pH in the range of about 0.1 to about 2.5.

6. The method of claim 5, wherein the solution from Step (e) has a pH in the range of about 0.3 to about 2.0.

7. The method of claim 5, wherein the solution from Step (e) has a pH in the range of about 0.5 to about 1.7.

8. The method of claim 5, wherein the solution from Step (e) has a pH in the range of about 0.7 to about 1.5.

9. The method of claim 5, wherein the solution from Step (e) has a pH in the range of about 0.8 to about 1.2.

10. The method of claim 5, wherein the solution from Step (e) has a pH of about 1.0.

11. The method of claim 5, wherein the amount of uranium-235 in the uranyl nitrate solution of Step (e) is from about 15 weight percent to about 20 weight percent.

12. The method of claim 11, wherein the amount of uranium-235 in the uranyl nitrate solution of Step (e) is in the range of about 19 weight percent to about 19.9 weight percent.

13. The method of claim 1, wherein the amount of uranium-235 in the uranyl nitrate solution of Step (d) is in the range of about 19 weight percent to about 19.9weight percent.

14. The method of claim 1, wherein the uranium concentration of the uranyl nitrate solution in Step (d) is in the range of about 100 grams of uranium per liter to about 300 grams of uranium per liter.

15. The method of claim 5, wherein the uranium concentration of the uranyl nitrate solution in Step (e) is in the range of about 100 grams of uranium per liter to about 300 grams of uranium per liter.

16. The method of claim 1, wherein Step (b) involves heating the solution to a temperature in the range of about 20° C. to about 85° C.

17. The method of claim 5, wherein Step (b) involves heating the solution to a temperature in the range of about 20° C. to about 85° C.

18. A method for producing a low enriched uranium fuel as reactor material, the method comprising the steps of:
   (i) providing at least one uranium oxide;
   (ii) adding at least one liquid acid compound to the at least one uranium oxide to produce a solution of one or more uranyl nitrate compounds;
   (iii) subjecting the one or more uranyl nitrate compounds to a heat-based aqueous dissolution step to produce a solution containing at least one uranyl nitrate compound;
   (iv) filtering the solution from Step (iii) to remove any insoluble residues; and
   (v) collecting the solution from Step (iv) that contains at least one uranyl nitrate compound,
   wherein the amount of uranium-235 in the uranyl nitrate solution of Step (v) is from about 15 weight percent to about 20 weight percent.

19. The method of claim 18, wherein aqueous dissolution Step (iii) is conducted in a dissolution vessel having a circulation system to both circulate the aqueous solution contained therein and to prevent any solid impurities from blocking the circulation system.

20. The method of claim 18, wherein the method further comprises the step of:
   (vi) adding at least one liquid acid compound or at least one liquid base compound to the solution of Step (v) to yield a solution having a pH in the range of about 0.1 to about 2.5.

21. The method of claim 20, wherein the solution from Step (vi) has a pH in the range of about 0.3 to about 2.0.

22. The method of claim 20, wherein the solution from Step (vi) has a pH in the range of about 0.5 to about 1.7.

23. The method of claim 20, wherein the solution from Step (vi) has a pH in the range of about 0.7 to about 1.5.

24. The method of claim 20, wherein the solution from Step (vi) has a pH in the range of about 0.8 to about 1.2.

25. The method of claim 20, wherein the solution from Step (vi) has a pH of about 1.0.

26. The method of claim 20, wherein the amount of uranium-235 in the uranyl nitrate solution of Step (vi) is from about 15 weight percent to about 20weight percent.

27. The method of claim 26, wherein the amount of uranium-235 in the uranyl nitrate solution of Step (vi) is in the range of about 19 weight percent to about 19.9 weight percent.

28. The method of claim 18, wherein the amount of uranium-235 in the uranyl nitrate solution of Step (v) is in the range of about 19 weight percent to about 19.9 weight percent.

29. The method of claim 18, wherein the uranium concentration of the uranyl nitrate solution in Step (v) is in the range of about 100 grams of uranium per liter to about 300 grams of uranium per liter.

30. The method of claim 20, wherein the uranium concentration of the uranyl nitrate solution in Step (vi) is in the range of about 100 grams of uranium per liter to about 300 grams of uranium per liter.

31. A method for producing a low enriched uranium fuel as reactor material, the method comprising the steps of:
   (A) providing at least one uranium metal or uranium source;
   (B) adding at least one liquid acid compound to the at least one uranium metal or uranium source to produce a solution of one or more uranyl nitrate compounds;
   (C) subjecting the one or more uranyl nitrate compounds to a heat-based aqueous dissolution step to produce a solution containing at least one uranyl nitrate compound;
   (D) filtering the solution of Step (C) to remove any insoluble residues; and
   (E) collecting the solution from Step (D) that contains at least one uranyl nitrate compound,
   wherein the amount of uranium-235 in the uranyl nitrate solution of Step (E) is from about 15 weight percent to about 20 weight percent.

32. The method of claim 31, wherein aqueous dissolution Step (C) is conducted in a dissolution vessel having a circulation system to both circulate the aqueous solution contained therein and to prevent any solid impurities from blocking the circulation system.

33. The method of claim 31, wherein the method further comprises the step of:
   (F) adding at least one liquid acid compound or at least one liquid base compound to the solution of Step (E) to yield a solution having a pH in the range of about 0.1 to about 2.5.

34. The method of claim 33, wherein the solution from Step (F) has a pH in the range of about 0.3 to about 2.0.

35. The method of claim 33, wherein the solution from Step (F) has a pH in the range of about 0.5 to about 1.7.

36. The method of claim 33, wherein the solution from Step (F) has a pH in the range of about 0.7 to about 1.5.

37. The method of claim 33, wherein the solution from Step (F) has a pH in the range of about 0.8 to about 1.2.

38. The method of claim 33, wherein the solution from Step (F) has a pH of about 1.0.

39. The method of claim 33, wherein the amount of uranium-235 in the uranyl nitrate solution of Step (F) is from about 15 weight percent to about 20 weight percent.

40. The method of claim 39, wherein the amount of uranium-235 in the uranyl nitrate solution of Step (F) is in the range of about 19 weight percent to about 19.9 weight percent.

41. The method of claim 31, wherein the amount of uranium-235 in the uranyl nitrate solution of Step (E) is in the range of about 19 weight percent to about 19.9 weight percent.

42. The method of claim 31, wherein the uranium concentration of the uranyl nitrate solution in Step (E) is in the range of about 100 grams of uranium per liter to about 300 grams of uranium per liter.

43. The method of claim 33, wherein the uranium concentration of the uranyl nitrate solution in Step (F) is in the range of about 100 grams of uranium per liter to about 300 grams of uranium per liter.

\* \* \* \* \*